Patented Jan. 31, 1950

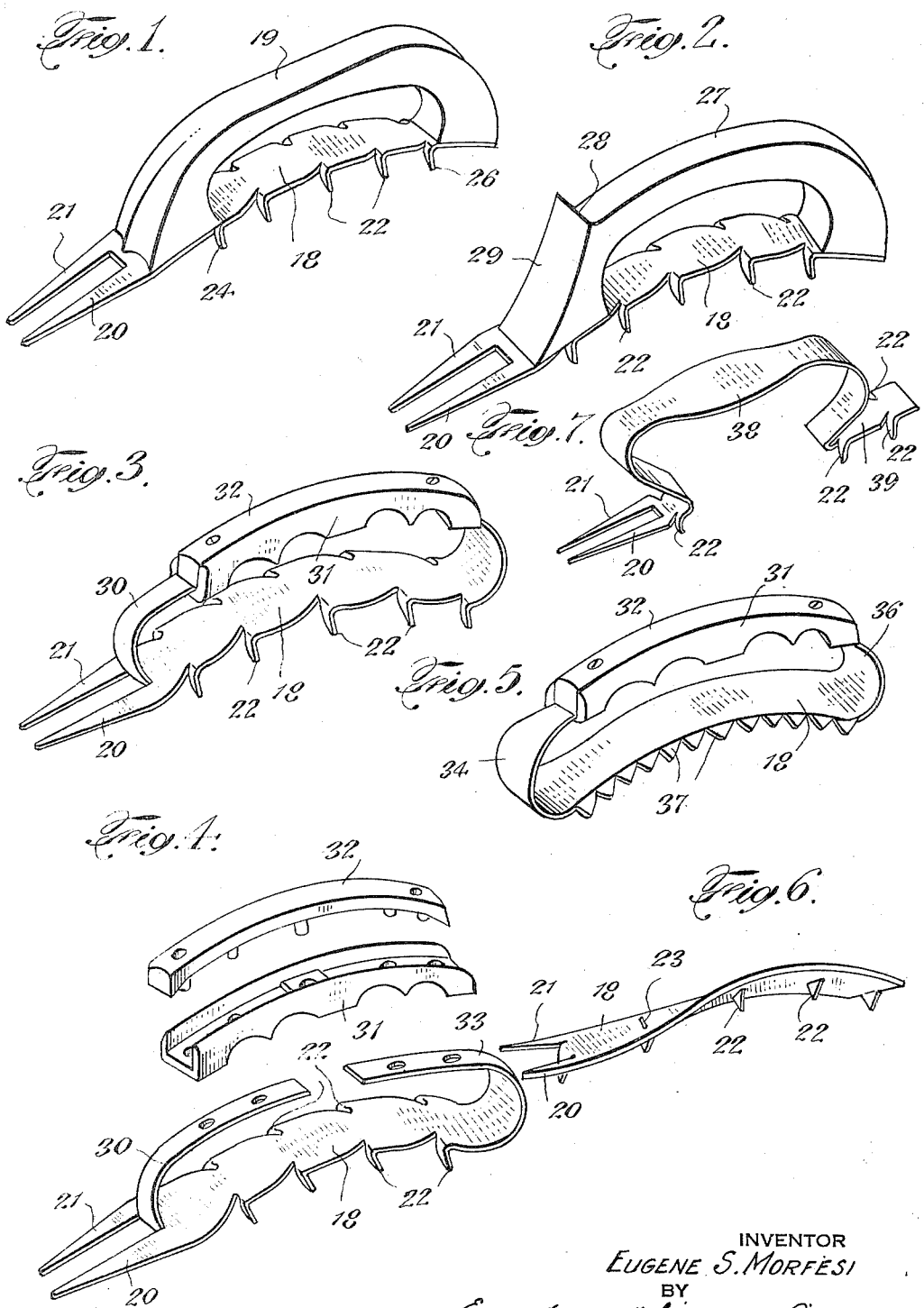

2,496,062

UNITED STATES PATENT OFFICE 2,496,062

MEAT HOLDER

Eugene S. Morfesi, Flushing, N. Y.

Application March 15, 1947, Serial No. 734,986

5 Claims. (Cl. 7—14)

This invention relates to an improved type of means for firmly holding in position an article or material to be treated or operated upon.

More particularly, the invention relates to an improved holder that is preferably gripped and carried by the hand and that will firmly hold an article or series of articles or a material in position while being cut or treated.

One of the particular uses for the improved holder herein is its use to hold meats, fowl, and other foods from slipping or twisting or oscillating while being carved either at the table or in the kitchen or at the restaurant counter or elsewhere.

In addition this improved holder is also provided with a special part or portion which is particularly adapted to pick up and move the portions of the foods which have been cut off or carved. If desired and in some instances, this special portion of the holder may also be employed to firmly hold food of various shapes, but usually of small size, in position while being carved.

This invention further relates to an improved single device of novel construction for hand use that functions in two ways in the carving and serving of foods or other products. It is constructed to hold the food very firmly at several points during carving and to assist in the serving of the food already cut or sliced. The novel structure is such that it will hold the food being carved at two, and preferably more, places which are of greater distance apart than the distance between the two tines of the usual carving fork. Thus, at least two of the places of contact of the holder with the food are relatively quite a distance apart.

The invention in its most pertinent use is a holder to be gripped and handled by one hand of the carver and quickly and easily placed in any position on the roast, fowl, fish, cheese, cabbage, or other food to be carved, and to firmly hold the food at several points during carving and then to be used to pick up the food and serve it. The improved construction is such that it provides for the holding of the food against slipping, twisting, or oscillating but still have any part of the holder enter the food only slightly, thus not binding the holder or instrument in the food so that it is required to be definitely and specially pulled out in order to serve the food. This holder or device only has to be raised from the food, not in opposition to any binding engagement, after the carving and then is used to pick up the food that has been cut off and serves it.

While the invention herein presents an improved holder which has done exceptionally well when used with carving of foods, it is to be understood that it may have many other uses, such for instance, as holding two or more strips of cloth together while they are being cut to a definite size, or are to be held in a definite position while being treated or operated upon.

One of the features of this novel holder is that of holding the material to be treated at several points well spaced apart during cutting and thus prevent twisting or oscillating of the material. For example, in the improved structure herein, there are two engaging points or places at each end of the gripping body of the holder that definitely engage the material to be held. Each of the two points forming a set are placed well apart from each other, and each set is positioned quite a distance from the other. Such engagement gives a four-point engagement forming preferably a rectangle. This gives a type of holding which eliminates rolling, twisting and oscillating of the material which is being cut, treated or acted upon. Another type of structure which produces the same advantageous result, is where there are several points of contact in a substantially straight line and acting with the rest of the holder in functioning to hold the food or material from small movements from its held position.

For purposes of describing the invention and the functioning thereof, the invention will be presented as a holder that is adapted for good and effective use in the carving of roasts, fowl or other foods at the table, or in the kitchen or in the restaurants or the like.

Other advantages and uses of this improved device or instrument or holder will be noted in regarding the following detailed description, wherein Fig. 1 is a perspective view of one form of the improved holder showing gripping points or teeth and serving tines;

Fig. 2 is a perspective view of a modified form of the holder particularly showing a different handle;

Fig. 3 is another modified form of the holder wherein parts thereof are bent to obtain another form of handle or gripping member;

Fig. 4 is an exploded view of the holder shown in Fig. 3 wherein the body parts of the handle are shown in detail;

Fig. 5 is a perspective view of a modification of the holder wherein there are several points or teeth for engagement, however, this form of holder does not include tines;

Fig. 6 is another form of a body part of a holder showing points or teeth specifically located back from the edges; and Fig. 7 is a modified form of holder wherein a single strip of material may be bent to form a handle and to provide the holding points or teeth and to provide one or more tines.

In this invention, it is desired to have an improved form of holder which may be gripped by the hand and be moved freely thereby to any particular portion of a food or material to be held in position during carving or cutting or otherwise being treated. It is preferred that the holder be constructed to have several points or teeth for engagement with the food or material and to have one or more tines or projections which are adapted to be inserted in the material, or food which has been cut for the purpose of moving it to another position. A satisfactory holder may be provided without the tines, if desired. In carving, the carved-off portion of the food would be transferred or moved to the service plate, and other material being treated may be easily caught on the tines and moved to a desired position. The tines may be somewhat blunt for food operations but in use with other materials, it may be desirable to have them very sharp and not as long as illustrated or may even be longer than illustrated, depending upon the use.

It is desired to provide an improved holder or instrument which will easily hold the food or material in position against any material rolling, twisting or oscillating so that the carving may be quite accurately done and then allow the holder to be quickly and easily removed from the food or material being treated, as by readily lifting it up and not having parts of the holder so imbedded in the food or the material that there is difficulty in raising the holder from the food or material.

Referring now to Fig. 1, the improved holder provides a body or strip 18 which has relative length and which has some width. One of the models has a body over three inches in length but is five inches long from the tip of the tine to the back end of the body and its width is approximately 1¼". A suitable handle 19 is provided for this body and preferably engages the body at the rear end thereof and just back of tines 20 and 21. These tines may be of any shape and any sharpness or bluntness, as desired for the purpose.

Preferably, the body 18 is provided with certain points or teeth, relatively sharp, for engaging the food or material so that the material will not move during carving or cutting or treatment. The points or teeth may be provided in any desired manner and may be as long or as sharp or as blunt as wished.

In the holder illustrated in Fig. 1 the points or teeth 22 are formed by cutting in from the edge of the body and pressing the points down so that they are somewhat at right angles to the body 18. Like points are cut and pressed from the other edge of the body 18. Thus, there is provided a series of points or teeth for engagement and partial entry into the food or material being carved or acted upon. The points 22 may also be provided as separate elements as illustrated in Fig. 6, and attached to the body 18 either being inserted as noted at 23 and headed over or they may be welded in position on the underside of the body 18. These points could be cut out and pressed down from between the edges of the body 18.

In the preferred form of holder one or more tines may be provided for serving the food that has been cut or for moving the material that has been cut or treated. In the preferred form two tines 20 and 21 have been shown as being satisfactory for serving the food or for picking up and moving the material and in some instances, may be employed to be forced into the food or material to hold it in position. This is particularly true when the width of the food or other material is relatively small.

Another feature of the invention so as to obtain a very satisfactory holding of the food or material, is that the body 18 and the points 22 may cooperate in holding the food or material in a predetermined position. By pressing down on the holder, the body 18 will engage the material and the points 22 enter the material and thereby hold it particularly against twisting or oscillating, as there are several points and they are positioned a relative distance apart.

It will be noted that with a holder of this type there will be at least a two-point engagement of the food or material at quite a distance apart as for instance, points or teeth 24 and 26, as noted in Fig. 2, are located quite a distance apart and thereby hold the food or material against twisting and oscillating. Also, the points on the opposite edge of body 18 and preferably opposite points 24 and 26 will give an excellent four-point contact and with relative distances between each one of the four points. This gives a type of holding by the points alone against twisting and oscillating, and if the body 18 is well pressed against the food or material, then there is an added holding advantage and the food or material may be easily and firmly held in position for any type of carving or treating. It will be noted that when the body 18 is well pressed against the food or material much of the under parts of the tines 20 and 21 will engage the material and thereby assist in holding for the reason that the material will "puff up" around each tine, whether or not there is one or more tines provided as part of the holder. It will also be noted that the extensions 20 and 21 forming the tines usually extend from the body 18 substantially in the plane of the continuation of the longer axis of the body 18. It is desirable however that at least much of the under sides of the tines and edges thereof shall cooperate with the prongs in holding the food or other material while it is being treated or processed as by carving or otherwise. It is to be further noted that the end points 24 and 26 and their counter points on the opposite edge of body 18, are not the only ones to give the four-point contact at distances apart but any adjacent four points will provide very satisfactory holding, even though the distance between the points is not as great.

Referring now to Fig. 2, there is illustrated a modified form of holder having a body 18 of substantially the same form as provided in Fig. 1 and the points or teeth 22 but with a handle 27 of little different formation and provided with a depression 28 for the thumb of the carver. The curved portion 29 of the front of the handle 27 is such that should the knife slip it will be guided upwardly and away from the hand which grips the main part of the handle 27.

Referring now to Figs. 3 and 4, there is illustrated a very satisfactory form of holder wherein the body 18 is easily made from a strip of metal and provides for the cutting and bending of front part 30 upwardly and backwardly to form a front end for a gripping handle comprised of a lower portion 31 and an upper portion 32. The back end 33 of the body 18 is turned upwardly and toward the front to be received by the handle portions 31 and 32 and to be firmly held therein. In the cutting-out of the front part 30, it will be noted that tines 20 and 21 are readily provided. These tines may be sharpened, as desired.

Referring now to Fig. 5, another type of holder is provided wherein the body 18 is a strip which has parts 34 and 36 at the end thereof turned upwardly and backwardly and forwardly respectively, to be received in the handle portions 31 and 32. The points 37 of relative sharpness, for engaging the food or material to be carved or treated, are shown as being formed in the edge of body 18 and then turned downwardly. A set of points 37 are also formed on the other edge of the body 18. It will be understood that other forms of points or teeth may be employed, if desired. It will also be noted that this holder does not have one or more tines for serving the food, but one or more such tines can be readily cut out of the part 34, or a tine may be welded on to the holder at any desired position.

In further reference to Fig. 6, it will be noted that the points or teeth 22 are somewhat in line from the front to the back of the body 18 and give several points of engagement at places of relative distances apart, and usually these points are of about ½" to 1" apart. These engaging points with the body 18 will give a firm holding of the food or material. However, it will be understood that the points acting alone will satisfactorily hold the food or material.

The body or strip 18 of Fig. 6 may be of the substantially flat form, as illustrated in Figs. 1, 2 and 3, or may be substantially straight flat but twisted somewhat, as shown in Fig. 6. Also, the body portion of the holder may be curved upwardly toward the handle to a relatively large or small extent, depending upon a particular use of the holder. Any satisfactory handle may be attached to the body 18 shown in this Fig. 6.

Referring now to Fig. 7, there is illustrated a modified form of holder, wherein a single strip of material is continuous in forming the handle, the engaging parts and the tines. For instance, the front of the strip or body provides the tines 20 and 21 and has, in this instance, two points 22 and then the strip is bent and cut so as to form a handle 38 and is then brought downwardly to form a flat part 39 and provides a satisfactory series of points or teeth 22 therein. Thus, the holder may be of one piece and so shaped that it will engage the food or material at at least two points a relative distance apart. Any other configuration of a single strip of material to provide a holder with the several advantages of the main holder, as noted in the description, may be made.

It will be further noted in regard to the holders illustrated in Figs. 3, 4 and 7, that should the carving knife slip, it would not cut the hand of the operator but would catch between the tines 20 and 21 and front 30 of the structure shown in Figs. 3 and 4, and between the tines 20 and 21 and the top of the handle 38 of the form illustrated in Fig. 7. Any type of handle may be employed with the body 18 of Fig. 6 so that a knife when slipping would not reach the hand of the carver.

It is understood that the holder herein may be employed for quickly and easily holding foods or materials during carving or treatment thereof without deeply piercing the food, and may be quickly removed and repositioned, as desired. It is very helpful with this type of holder to maintain the food or material from slipping, twisting or oscillating, thereby permitting satisfactory carving of foods at the table or of treating material whereby accurate cutting or treating may be done without the material moving.

The holder is of simple construction but its function and operations are of very considerable value. In some instances, sufficient holding of the food or material may be easily gained by only using the points or teeth 22, while in holding other foods and materials, it may be desired to press the handle considerably and force the body portion 18 and all of the points 22 and the under sides of the tines 20 and 21 to engage the food or material, thus to gain a firmer holding of the material being treated.

It is to be noted that the body or strip 18 may be made of any desirable material. For many uses, however, it is desired to make it of metal. The gauge or thickness of the metal being used for various purposes, may be varied. In some instances, the body 18 may be quite stiff and again it may be quite flexible so as to conform to a good deal of the outer surface of the item or material being held. Also the normal upward curve of the body may be of greater or smaller radius as desired for various purposes.

It will also be noted that the improved holder may extend over more than one article or item or piece of food to hold them firmly in position for cutting or treatment.

This improved item has many advantages, among them being quick replacement, firm holding during carving or treatment, quick and easy removal without being specifically withdrawn and does not need to be dug deeply into the food or material.

It will be understood that various modifications and changes may be made in the preferred form of the invention herein, and such modifications and changes are to be understood as being part of this invention, as outlined in the following claims.

The invention claimed is:

1. An instrument for holding a food product during carving, said instrument including an elongated body, a plurality of points depending from said body to engage said food to hold it in a predetermined position, said body having at least one tine extending outwardly therefrom and being substantially in a plane with the under side of said elongated body, said tine assisting said points in their holding operations, and a handle attached to said body.

2. A holder for temporarily gripping food while being carved, including an elongated body having a part thereof adapted to engage the food, relatively short points depending from said body to also engage the food to prevent twisting during carving, one end of said body extending forward and positioned to also engage the food during carving, said end being formed to provide two tines for later picking up the food which has been carved.

3. A holder for maintaining a product in a definite position when engaged therewith, said holder including an elongated one-piece body, a plurality of short stubby prongs all extending in the same direction from the under surface of said body, a tine extending from one end of said elongated body in a direction of the longer axis thereof and being substantially in a plane that is a continuation of the elongated axis of said body, and a handle forming part of said body for placing said holder in pressure engagement with the product so as to have some of said prongs and part of said tine engage said product in at least two separated positions to prevent twisting of the product, said holder thereafter being raised from said product and using said tine to engage and move a cut portion of said product from one position to another.

4. A food holder comprising an elongated one-piece body and being slightly curved concavely in respect to its under surface, a series of more than two prongs extending in one direction from said concaved surface, said prongs being spaced along at least one-half the length of said body, a plurality of tines formed in one end of said body and being in a plane which is the continuation of said concaved surface and in line with the longer axis of said body, and a handle fixed to said body, said tines and said prongs when engaging a food product prevents the twisting thereof while being carved, said holder thereafter being raised from said food product and the tines then employed to engage the carved-off food and move it from one position to another.

5. In a holder a relatively thin elongated body having a length of more than three inches and width of more than one-half inch, said body being slightly curved concavely in respect to its under surface and having portions of said concave surface bent downwardly therefrom to form relatively short sharp prongs, said body having one end formed into tines, said tines and said prongs cooperating in engaging a food at various points to prevent the food from twisting during processing thereof, and a handle fastened to said body for pressing said holder against the food and for later directing said tines to move the part of the food which has been carved.

EUGENE S. MORFESI.

REFERENCES CITED

The following references are of record in the file of this patent:

UNITED STATES PATENTS

| Number | Name | Date |
|---|---|---|
| 2,007,237 | Adams | July 9, 1935 |
| 2,207,286 | Cohen | July 9, 1940 |

FOREIGN PATENTS

| Number | Country | Date |
|---|---|---|
| 18,399 | Great Britain | Aug. 7, 1914 |
| 288,890 | Germany | Nov. 23, 1915 |
| 141,561 | Great Britain | Apr. 22, 1920 |
| 595,531 | Germany | Apr. 13, 1934 |